(12) United States Patent
Kobayashi et al.

(10) Patent No.: US 6,403,048 B1
(45) Date of Patent: Jun. 11, 2002

(54) COMBUSTION CATALYSTS AND PROCESSES FOR REMOVING ORGANIC COMPOUNDS

(75) Inventors: Wataru Kobayashi; Masao Nakano, both of Yamaguchi-ken (JP)

(73) Assignee: Tosoh Corporation, Yamaguchi-ken (JP)

( * ) Notice: Subject to any disclaimer, the term of this patent is extended or adjusted under 35 U.S.C. 154(b) by 0 days.

(21) Appl. No.: 09/471,001

(22) Filed: Dec. 23, 1999

(30) Foreign Application Priority Data

Dec. 25, 1998 (JP) ............................................. 10-369355
Dec. 25, 1998 (JP) ............................................. 10-369356

(51) Int. Cl.⁷ ............................. B01J 8/00; A62D 3/00; B01D 53/70; B01D 53/72
(52) U.S. Cl. .............................. 423/245.3; 423/240 S; 588/205; 588/206; 588/209; 588/213
(58) Field of Search .......................... 423/245.1, 245.3, 423/240 S; 588/205, 206, 209, 213

(56) References Cited

U.S. PATENT DOCUMENTS

| | | | | |
|---|---|---|---|---|
| 4,001,144 A | * | 1/1977 | Pearson et al. |
| 4,053,557 A | * | 10/1977 | Kageyama |
| 4,456,699 A | * | 6/1984 | Hensley, Jr. et al. |
| 4,500,424 A | * | 2/1985 | Simpson et al. |
| 4,572,778 A | * | 2/1986 | Ward |
| 4,940,687 A | * | 7/1990 | Liu et al. |
| 4,983,366 A | | 1/1991 | Deller et al. |
| 5,108,717 A | | 4/1992 | Deller et al. |
| 5,276,249 A | * | 1/1994 | Greene et al. |
| 5,403,798 A | * | 4/1995 | Brendley, Jr. et al. |
| 5,643,545 A | | 7/1997 | Chen et al. |
| 5,834,522 A | * | 11/1998 | Mignard et al. |
| 5,851,948 A | * | 12/1998 | Chuang et al. |
| 6,120,747 A | * | 9/2000 | Sugishima et al. |

FOREIGN PATENT DOCUMENTS

| | | |
|---|---|---|
| EP | 0 308 789 A | 3/1989 |
| EP | 0 516 850 A1 | 9/1992 |
| EP | 0 645 172 A | 3/1995 |
| EP | 0 665 280 A | 8/1995 |
| EP | 0 800 865 A | 10/1997 |
| JP | 6-87950 | 9/1988 |
| JP | 4-250825 | 12/1990 |
| JP | 4-284849 | 3/1991 |
| JP | 8-38896 | 7/1994 |

OTHER PUBLICATIONS

Müller et al "Catalytic Purification of Waste Gases containing Chlorinated Hydrocarbons with Precious Metal Catalysts", Catalyst Today, 117, 383–390, 1993.

\* cited by examiner

Primary Examiner—Steven P. Griffin
Assistant Examiner—Christina Ildebrando
(74) Attorney, Agent, or Firm—Sughrue Mion, PLLC

(57) ABSTRACT

Catalysts for removing organic compounds from a gas stream containing the same and processes for removing organic compounds from the gas stream using the cataylst are disclosed.

According to the first aspect, a combustion catalyst for removing organic compounds comprises a mixture of a zeolite and a metal oxide containing at least one of the elements of the platinum group. According to the second aspect, a combustion catalyst for removing organic compounds comprises an alumina having such a pore size distribution that, where "a" represents a pore radius in Å at the maximum of the pore size distribution curve, the accumlated pore volume of pores having radii in the range of "a"±Å is at least 65% of the total volume of all the pores, said alumina containing less than 1% by weight of rare earth elements and being loaded with one or more elements of the platinum group.

According to third aspect, there is a process for removing organic compounds, said process comprising the step of contacting organic compounds with either one of the catalysts according to the first and second aspects of the invention.

14 Claims, No Drawings

COMBUSTION CATALYSTS AND PROCESSES FOR REMOVING ORGANIC COMPOUNDS

BACKGROUND OF THE INVENTION

This invention relates to catalysts for removing organic compounds from a gas stream containing the same and processes for removing organic compounds from the gas stream using the catalysts, and particularly to such catalysts as are effective for removing organic compounds diluted in a gas stream and processes for removing such organic compounds from the gas stream using the catalysts.

A wide range of synthetic organic compounds are processed and produced as intermediates and products in chemical plants, with a concomitant leakage or accidental discharge into the environment. Frequently, exhaust gases from waste incinerator plants contain organic compounds. Many such organic compounds are harmful to both the environment and health. Consequently, there is a need to establish an effective emission control technique. Particularly, there is a need to develop effective and practical techniques for controlling emission of volatile organic compounds or halogen-containing organic compounds.

There have been proposed many methods for removing organic compounds from gas streams, including adsorption, direct combustion and catalytic combustion methods. Though the adsorption method may work effectively when it is employed for treating a gas stream having a high content of organic compounds, removal efficiency may deteriorate when it is used for treating a gas stream containing dilute organics. In the case of the direct combustion method, a temperature as high as 800° C. or higher is required, which is not economically viable. Furthermore, the direct combustion method suffers from the problem that nitrogen oxides are generated which could result in a source of secondary pollution.

As a catalytic combustion method, for example, Japanese Patent Public Disclosure (KOKAI) No. HEI-4-250825 describes a method for treating a gas stream containing halogen-containing organic compounds, wherein said gas stream is brought into contact with an acidic zeolite. In the method, the halogen-containing organic compounds are treated by contacting the gas stream with an acidic zeolite or an acidic zeolite that is loaded and/or exchanged with at least one metal belonging to the 2nd to 6th periods of the Periodic Table of Elements.

Further, Japanese Patent Public Disclosure (KOKAI) No. HEI-4-284849 discloses a catalyst for decomposing 1,2-dichloroethane and a method for treating a waste gas stream with such a catalyst. In the disclosed method, the 1,2-dichloroethane decomposing catalyst comprises an acidic zeolite or an acidic zeolite which has been loaded and/or ion-exchanged with a transition metal(s).

Further Japanese Patent Public Disclosure (KOKAI) No. HEI-8-38896 discloses a catalyst for decomposing chlorinated volatile organic compounds. According to the disclosure, the catalyst is capable of decomposing chlorinated volatile organic compounds in the presence of steam and oxygen. The catalyst comprises at least one element selected from platinum, palladium and ruthenium as a primary catalytically active substance which is supported on a carrier consisting essentially of zirconia, said carrier supporting further a cocatalyst comprising boron oxide. In the catalyst, the proportion of the primary catalytically active ingredient is, calculated as metal, 0.1 to 5% by weight on the basis of the total weight of catalyst, and the proportion of the cocatalyst is, calculated as $B_2O_3$, 2 to 5% by weight on the same basis.

Japanese Patent Public Gazette (KOKOKU) No. HEI-6-87950 describes a process for catalytically reacting a waste gas stream containing hydrocarbons, halogenated hydrocarbons and carbon monoxide, and an apparatus for effecting such a process. The reference particularly describes a process for catalytically contacting a waste gas stream from vinyl chloride synthesis, wherein said gas stream is passed through a first zone including a catalyst for oxidatively decomposing the noxious compounds at 300–800° C., and then through a second zone including a catalyst for oxidatively combusting the noxious compounds. The first zone catalyst comprises, as a catalytically active substance, aluminum oxide, silica dioxide and/or a zeolite, which may contain optionally 0.1 to 20% by weight of one or more oxides of elements Ba, Cu, Cr and Ni. The second zone catalyst comprises, as a catalytically active ingredient, platinum and/or palladium, or a combination of platinum and rhodium.

As above-mentioned, prior art references Japanese Patent Public Disclosure (KOKAI) Nos. HEI-4-250825 and 4-284849 disclose methods for treating gas streams contaminated with halogen-containing organic compounds, in which the gas streams are brought into contact with either an acidic zeolite or an acidic zeolite supporting and/or exchanged with at least one metal belonging to the 2nd–6th periods of the Periodic Table of Elements. However, these catalysts are not satisfactory in their gas cleaning performance in that the methods can produce by-products including halogen-containing compounds other than those that are envisaged to be removed through the methods.

On the other hand, the combustion methods disclosed in the above-mentioned references Japanese Patent Public Disclosure (KOKAI) No. HEI-8-38896 and Japanese Patent Public Gazette (KOKOKU) No. HEI-6-87950 require a considerably raised operation temperature exceeding about 500° C.

Accordingly, one of the important objects of the invention is to provide improved high-performance combustion catalysts capable of treating a waste gas stream containing organic compounds without yielding undesirable by-products.

A further primary object of the invention is to provide a method in which such a catalyst is employed efficiently for removing harmful or noxious organic compounds present in a gas stream without yielding undesirable by-products. The other objects and advantages of the invention will become clear from the description given below.

SUMMARY OF THE INVENTION

The inventors have concentrated their efforts on resolving the above-discussed problems presented by the prior art. As a result, it has been found that a mixture of a zeolite and a metal oxide containing at least one element of the platinum group provides an effective combustion catalyst capable of removing organic compounds in a gas stream without producing by-products.

It has been also found that a similarly effective catalyst is provided by an alumina having such a pore size distribution that, where "a" represents a pore radius in Å at the maximum of the pore size distribution curve, the accumulated pore volume of pores having radii in the range of "a"±25 Å is at least 65% of the total volume of all the pores, said alumina containing less than 1% by weight of rare earth elements and being loaded with one or more elements of the platinum group. The invention is based on these and incidental findings.

Thus, according to the first aspect of the present invention, there is provided a combustion catalyst for removing organic compounds, which comprises a mixture of a zeolite and a metal oxide containing at least one of the elements of the platinum group.

According to the second aspect of the invention, there is provided a combustion catalyst for removing organic compounds, which comprises an alumina having such a pore size distribution that, where "a" represents a pore radius in Å A at the maximum of the pore size distribution curve, the accumulated pore volume of pores having radii in the range of "a"±25 Å is at least 65% of the total volume of all the pores, said alumina containing less than 1% by weight of rare earth elements and being loaded with one or more elements of the platinum group.

The third aspect of the invention concerns methods for removing organic compounds comprising bringing the organic compounds into contact with either one of the catalysts of the invention. The invention will hereinbelow be illustrated in more detail.

DETAILED DESCRIPTION OF THE INVENTION

The first aspect of the present invention will be described.

The catalyst according to the first aspect of the invention comprises a mixture of a zeolite and a metal oxide or oxides containing at least one of the elements of the platinum group.

Zeolites are crystalline aluminosilicates that are represented generally by the chemical composition:

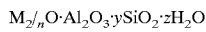

$$M_{2/n}O \cdot Al_2O_3 \cdot ySiO_2 \cdot zH_2O$$

where n is the valence of cation M, y is a number of 2 or greater, and z is a number of zero or greater. There are many kinds of known natural and synthetic zeolites. Zeolites suitable for use in the present invention are not restricted to any specific one. In order to attain a high durability or a long service time, however, it is preferred to employ zeolites having an $SiO_2/Al_2O_3$ molar ratio of 10 or higher in the above-defined chemical composition. As typical examples, there may be mentioned ferrierite, Y, erionite, mordenite, ZSM-5, ZSM-11, beta, etc. These natural and synthetic zeolites may be used as they are or they may be ion-exchanged or calcined before being used in the invention. Preferably, the zeolite to be used in the invention is ion-exchanged. In this case, though the cation species used in ion-exchange is not limited to any specific species, preferably a species from Group IA and/or IIA, and more preferably from Group IIA of the Periodic Table, is used for ion-exchanging purposes. A particularly preferred cation is calcium ion. Two or more cationic species may be used in combination.

The "metal oxide(s)" which may be used in the invention include oxide(s) of metal(s) from Groups IVA, VA, VIA, VIIA, VIII, IB, IIB, IIIB, IVB and VB of the Periodic Table. Amongst them, alumina, titanium oxide, zirconium oxide and silica are preferred.

It is known that alumina is porous. Generally, the size of pores in alumina materials is not uniform and varies widely. Thus, the radii of pores of an alumina material fall in a range of distribution. Where an alumina is employed as a metal oxide material in the first aspect of the present invention, preferably the alumina has such a pore size distribution that, where "a" represents a pore radius in Å at the maximum of the pore size distribution curve, the accumulated pore volume of pores having radii in the range of "a"±25 Å is at least 65% of the total volume of all the pores. This is because it has been found that an alumina material showing such pore size characteristics enables efficient removal of organic compounds to be achieved easily by strongly promoting combustion thereof. Though the mechanism by which combustion is promoted significantly as a consequence of the stated pore size characteristics has not yet been made clear, it has been found that the performance of a combustion catalyst is largely affected by a pore size "distribution" rather than the pore size itself, i.e., the "radius".

Further, where an alumina is employed as a metal oxide material in the first aspect of the present invention, it is preferable that the alumina material has a content of rare earth elements of not greater than 1% by weight, preferably not greater than 500 p.p.m. and more preferably it contains rare earth elements in an amount less than a detectable level. The "rare earth elements" referred to herein include elements of atomic numbers 57–71 and scandium and yttrium. Usually the content of rare earth elements in alumina may be determined by analyzing the elements using ICP (inductively coupled plasma) emission spectroscopy. A content of not greater than 1% by weight of rare earth elements in the alumina material will enable a highly effective combustion of organic compounds to be achieved easily. Elements other than the rare earth elements may be present in the alumina material without adversely affecting the performance of the catalyst.

The "element(s) of the platinum group" as mentioned herein include six elements that are ruthenium, osmium, rhodium, iridium, palladium and platinum. The most preferred is platinum.

The process for loading the element of the platinum group on the metal oxide is not limited to any specific one. For example, an impregnation technique, ion-exchanging technique or the like may be used for introducing the element of the platinum group into the metal oxide. Where, for example, platinum is to be introduced into a metal oxide material by the ion-exchanging technique, the oxide material is added into a solution containing platinum ions and the resulting mixture is stirred at about 20–100° C. for a period of about 5 minutes-100 hours. In the case where an alumina material is to be impregnated with platinum, for example, the alumina material may be added into a solution containing platinum ions and thereafter the solvent, e.g. water, may be removed from the mixture. Examples of the platinum salts which may be used include the ammine complex salt, the dinitrodiammine complex, the chloride salt and the like.

Though the content of the element of the platinum group contained in the metal oxide is not restricted to any specific range, preferably the content ranges from 0.0005 to 10.0% by weight, more preferably from 0.01 to 8.0% by weight, on the basis of the total weight of the metal oxide and the element of the platinum group, in order to obtain an enhanced performance catalyst.

Though the ratio of the metal oxide containing at least one element of the platinum group to the zeolite is not restricted to any specific range, preferably the ratio ranges from 1:20 to 20:1 by weight to obtain a particularly satisfactory catalyst.

The catalyst according to the invention comprises a mixture of a zeolite and a metal oxide containing at least one element of the platinum group. Preferably the mixture is homogeneous, and it is preferable for both the materials to be in powdered form. The mixture may be prepared by any appropriate technique. The materials may be combined together in powder form or slurry form so as to provide eventually a homogeneous mixture. As an alternative method, it is possible to prepare a mixture by mixing a raw metal oxide and a zeolite, and thereafter load at least one element of the platinum group on the metal oxide in the resulting mixture.

The combustion catalysts for removing organic compounds according to the first aspect of the invention may be pretreated, for example, by drying, dehydration, calcination or the like before they are supplied to any intended combustion processes.

The combustion catalysts for removing organic compounds according to the invention may be supplied in any form, such as powder, pellets, honeycomb structure or other appropriate geometric configuration. For example, a binder, such as alumina sol, silica sol or a clay, may be added to the catalyst to be formed into any desired shape or configuration. Alternatively, water may be added to the catalyst powder to prepare a slurry which is applied onto, for example, the surface of a honeycomb refractory substrate made of alumina, magnesia, cordierite or the like.

Now the second aspect of the present invention will be described. The second aspect concerns a combustion catalyst for removing organic compounds, which comprises an alumina having such a pore size distribution that, where "a" represents a pore radius in Å at the maximum of the pore size distribution curve, the accumulated pore volume of pores having radii in the range of "a"±25 Å is at least 65% of the total volume of all the pores, said alumina containing less than 1% by weight of rare earth elements and being loaded with one or more elements of the platinum group.

It has been found that employment of an alumina material showing such pore size characteristics in the pore size distribution enables efficient removal of organic compounds to be achieved easily by greatly promoting combustion thereof. Though the mechanism by which combustion is promoted significantly as a consequence of the stated pore size characteristics has not yet been made clear, it has been found that the performance of a combustion catalyst is largely affected by a pore size "distribution" rather than the pore size itself, i.e., the "radius".

It is essential that the alumina contains not greater than 1% by weight, preferably not greater than 500 p.p.m. and more preferably less than the detectable level, of rare earth elements, such as elements of atomic numbers 57–71 and scandium and yttrium. Use of an alumina material having such a content of rare earth elements will enable highly effective combustion of organics to be achieved. Elements other than the rare earth elements may be present in the alumina material without adversely affecting the performance of the catalyst. Incidentally, the content of rare earth elements in alumina may be determined by analyzing the elements using ICP (inductively coupled plasma) emission spectroscopy.

In the second aspect of the invention, the element of the platinum group or elements that is/are to be contained in the alumina material are selected from six elements of ruthenium, osmium, rhodium, iridium, palladium and platinum as mentioned hereinbefore with respect to the first aspect of the invention. Similarly, the most preferred is platinum.

The process for loading the element of the platinum group on the alumina material is not limited to any specific means. For example, as previously mentioned with respect to the first aspect, an impregnation technique, ion-exchanging technique or the like may be used for introducing the element of the platinum group ingredient into the alunima material.

Though the content of the element of the platinum group contained in the alumina material is not restricted to any specific range, preferably the content ranges from 0.0005 to 10.0% by weight, more preferably from 0.01 to 8.0% by weight, on the basis of the total weight of the alumina and the element of the platinum group, in order to obtain an enhanced performance catalyst.

The combustion catalysts for removing organic compounds according to the second aspect of the invention may be pretreated before use as previously mentioned with respect to the first aspect catalysts. Similarly, the second aspect catalysts may be supplied in any suitable shape or configuration or structure.

The third aspect of the invention will be now illustrated. The third aspect concerns a process for removing organic compounds, said process comprising the step of contacting organic compounds with either one of the catalysts according to the first and second aspects of the invention.

The organic compounds which may be removed or destroyed by the invention are carbon compounds which may contain hydrogen, halogen atoms, oxygen etc. in the molecule. As non-limiting examples, there may be mentioned methane, ethane, propane, ethylene, propylene, butadiene, benzene, xylenes, toluenes, chloroform, dichloromethane, trichloromethane, carbon tetrachloride, methylbromide, 1,2-dichloroethane, vinyl chloride, monochlorobenzene, chlorofluorocarbons, PCBs, dioxins, etc. Amongst halogen-containing organic compounds and/or organic compounds showing a vapor pressure of 0.01 kPa or higher at a temperature of 293.15° K, hydrocarbons containing two carbon atoms and/or $C_2$ chlorinated hydrocarbons may be effectively treated in accordance with the invention.

The "halogens" as used herein include fluorine, chlorine, bromine and iodine. The expression "organic compounds showing a vapor pressure of 0.01 kPa or higher at a temperature of 293.15° K." is a measure for defining volatile organic compounds including, for example, methane, ethane, propane, ethylene, propylene, butadiene, benzene, xylenes, toluenes, chloroform, dichloromethane, trichloromethane, carbon tetrachloride, methylbromide, 1,2-dichloroethane, vinyl chloride, monochlorobenzene, chlorofluoro-carbons etc.

When a gas stream containing organic compounds or substances is to be treated for combustion of the organics in the present process, it is preferred that the organics are present initially in a concentration of less than about 1%.

Though the process conditions, such as space velocity and temperature, are not restricted to any specific ranges thereof, a preferred range of the space velocity is from about 100 to 500,000 $hr^{-1}$ and a preferred range of the operation temperature is from about 100 to 700° C.

When a gas stream containing organic compounds is subjected to the present combustion process, the raw gas stream may contain other substances, such as water, oxygen, hydrogen, hydrogen chloride, nitrogen oxides, sulfur dioxides, hydrocarbons and fine particulate objects.

EXAMPLE

The invention will be described in more detail with reference to the following non-limiting examples.

Example 1

Preparation of Catalyst 1

An alumina material (commercially available from Sumitomo Chemical Co., Ltd. under the trade mark "TA-1311") in an amount of 30 g was added into 270 mls. of a 2.85 mM aqueous solution of tetraammine-dichloro platinum. The resulting mixture was dried under reduced pressure to give a platinum-loaded alumina. BY ICP emission spectroscopy, a platinum content of 0.5% by weight was found, but no rare earth elements were detected. By a nitrogen adsorption method, it was determined that the alumina had such a pore size distribution that, where "a" represented a pore radius in Å at the maximum of the pore size distribution curve, the accumulated pore volume of pores having radii in the range of "a"±25 Å was 90% of the total volume of all the pores.

A mordenite type zeolite having an $SiO_2/Al_2O_3$ molar ratio of 15.7 (commercially available from Tosoh Corporation under the trade mark "HSZ-620-HOA") in an amount of 50 g was introduced into 450 mls. of a 2.26 M aqueous sodium acetate solution. The resulting mixture was stirred at 60° C. for 20 hours to effect ion-exchanging. The slurry was separated into solid and liquid phases and the resulting zeolite cake was added into 450 ml of a 2.26 M aqueous sodium chloride solution to effect again ion-exchanging with stirring at 60° C. for 20 hours. After solid- liquid separation, the solid cake was washed repeatedly with pure water until no chloride ion was detected in the filtrate. Then, the solid was dried at 110° C. for 20 hours to give a sodium-form mordenite.

A 10 g portion of the thus obtained sodium-form mordenite and a 10 g portion of the previously obtained platinum-loaded alumina were combined and mixed thoroughly to give "Catalyst 1".

Example 2

Preparation of Catalyst 2

A mordenite type zeolite having an $SiO_2/Al_2O_3$ molar ratio of 15.7 (commercially available from Tosoh Corporation under the trade mark "HSZ-620-HOA") in an amount of 50 g was introduced into 450 mls. of a 1.13 M aqueous calcium acetate solution. The resulting mixture was stirred at 60° C. for 20 hours to effect ion-exchanging. The slurry was separated into solid and liquid phases and the resulting zeolite cake was added into 450 ml of a 1.13 M aqueous calcium chloride solution to effect again ion-exchanging with stirring at 60° C. for 20 hours. After solid-liquid separation, the solid cake was washed repeatedly with pure water until no chloride ion was detected in the filtrate. Then, the solid was dried at 110° C. for 20 hours to give a calcium-form mordenite.

A 10 g portion of the thus obtained calcium-form mordenite and a 10 g portion of the platinum-loaded alumina obtained in EXAMPLE 1 were combined and mixed thoroughly to give "Catalyst 2".

Example 3

Preparation of Catalyst 3

An alumina material (commercially available from Sumitomo Chemical Co., Ltd. under the trade mark "TA-1311") in an amount of 20 g was added into 180 mls. of a 28.5 mM aqueous solution of dinitro-diammine platinum. The resulting mixture was stirred at 30° C. for 2 hours and then separated into solid-liquid phases. The solid phase was washed with pure water and dried at 110° C. for 20 hours to give a platinum-loaded alumina. BY ICP emission spectroscopy, a platinum content of 4.3% by weight was found.

A 2 g portion of the thus obtained platinum-loaded alumina and a 8 g portion of the sodium-form mordenite previously obtained in EXAMPLE 1 were combined and mixed thoroughly to give "Catalyst 3".

Example 4

Preparation of Catalyst 4

The procedure of EXAMPLE 3 was repeated to give "Catalyst 4" except that the sodium-form mordenite was used in an amount of 18 g.

Example 5

Preparation of Catalyst 5

A ZSM-5 type zeolite having an $SiO_2/Al_2O_3$ molar ratio of 40 (commercially available from Tosoh Corporation under the trade mark "HSZ-840-NHA") in an amount of 50 g was introduced into 450 ml of a 0.9 M aqueous sodium chloride solution. The resulting mixture was stirred at 60° C. for 20 hours to effect ion-exchanging. The slurry was separated into solid and liquid phases and the resulting zeolite cake was added into 450 ml of a 0.9 M aqueous sodium chloride solution to effect again ion-exchanging with stirring at 60° C. for 20 hours. After solid-liquid separation, the solid cake was washed repeatedly with pure water until no chloride ion was detected in the filtrate. Then the solid was dried at 110° C. for 20 hours to give a sodium-form ZSM-5.

An 8 g portion of the thus obtained sodium-form ZSM-5 and a 2 g portion of the platinum-loaded alumina prepared in EXAMPLE 3 were combined and mixed thoroughly to give "Catalyst 5".

Example 6

Preparation of Catalyst 6

A beta type zeolite having an $SiO_2/Al_2O_3$ molar ratio of 25.7 (commercially available from Tosoh Corporation under the trade mark "HSZ-930-HOA") in an amount of 50 g was introduced into 450 ml of a 0.69 M aqueous calcium acetate solution. The resulting mixture was stirred at 60° C. for 20 hours to effect ion-exchanging. The slurry was separated into solid and liquid phases and the resulting zeolite cake was added into 450 ml of a 0.69 M aqueous calcium chloride solution to effect again ion-exchanging with stirring at 60° C. for 20 hours. After solid-liquid separation, the solid cake was washed repeatedly with pure water until no chloride ion was detected in the filtrate. Then, the solid was dried at 110° C. for 20 hours to give a calcium-form beta zeolite.

An 8 g portion of the thus obtained calcium-form beta zeolite and a 2 g portion of the platinum-loaded alumina prepared in EXAMPLE 3 were combined and mixed thoroughly to give "Catalyst 6".

Example 7

Preparation of Catalyst 7

A titanium oxide material (commercially available from Sakai Chemical Industry Co., Ltd. under the trade mark "SSP-20") in an amount of 20 g was added into 180 mls. of a 2.85 mM aqueous solution of tetraammine-dichloro platinum. The resulting mixture was dried at 80° C. under reduced pressure to give a platinum-loaded titanium oxide. BY ICP emission spectroscopy, a platinum content of 0.5% by weight was found.

A 10 g portion of the thus obtained platinum-loaded titanium oxide and a 10 g portion of the sodium-form mordenite obtained in EXAMPLE 1 were combined and mixed thoroughly to give "Catalyst 7".

Example 8

Preparation of Catalyst 8

A zirconium oxide material (commercially available from Tosho Corporation under the trade mark "TZ-8Y") in an amount of 20 g was added into 180 mls. of a 2.85 mM aqueous solution of tetraammine-dichloro platinum. The resulting mixture was dried at 80° C. under reduced pressure to give a platinum-loaded zirconium oxide. BY ICP emission spectroscopy, a platinum content of 0.5% by weight was found.

A 10 g portion of the thus obtained platinum-loaded zirconium oxide and a 10 g portion of the sodium-form mordenite obtained in EXAMPLE 1 were combined and mixed thoroughly to give "Catalyst 8".

Example 9

Preparation of Catalyst 9

A portion of the platinum-loaded alumina as prepared in EXAMPLE 1 was used as "Catalyst 9".

Example 10

Preparation of Catalyst 10

An alumina material (commercially available from Sumitomo Chemical Co., Ltd. under the trade mark "AC-11K") in an amount of 20 g was added into 180 mls. of a 2.85 mM aqueous solution of tetraammine-dichloro platinum. The resulting mixture was dried at 80° C. under reduced pressure to give a platinum-loaded alumina. This will be referred to as "Catalyst 10" hereinafter. BY ICP emission spectroscopy, a platinum content of 0.5% by weight was found, but no rare earth elements were detected. By a nitrogen adsorption method, it was determined that the alumina had such a pore size distribution that, where "a" represented a pore radius in Å at the maximum of the pore size distribution curve, the accumulated pore volume of pores having radii in the range of "a"±25 Å was 67% of the total volume of all the pores.

Example 11

Preparation of Catalyst 11

An alumina material (commercially available from Nikki Chemical Co., Ltd. under the trade mark "N613N") in an amount of 20 g was added into 180 mls. of a 2.85 mM aqueous solution of tetraammine-dichloro platinum. The resulting mixture was dried at 80° C. under reduced pressure to give a platinum-loaded alumina. This will be referred to as "Catalyst 11" hereinafter. BY ICP emission spectroscopy, a platinum content of 0.5% by weight was found, but no rare earth elements were detected. By a nitrogen adsorption method, it was determined that the alumina had such a pore size distribution that, where "a" represented a pore radius in Å at the maximum of the pore size distribution curve, the accumulated pore volume of pores having radii in the range of "a"±25 Å was 92% of the total volume of all the pores.

Example 12

Preparation of Catalyst 12

The sodium-form mordenite and the platinum-loaded alumina as prepared in EXAMPLE 1 were used in combination as a front stage catalyst and a rear stage catalyst, respectively, i.e. without mixing together; this combination catalyst will be referred to as "Catalyst 12".

Comparative Example 1

Preparation of Comparative Catalyst 1

A portion of the sodium-form mordenite as prepared in EXAMPLE 1 was used as a comparative catalyst. This will be referred to as "Comparative Catalyst 1".

Comparative Example 2

Preparation of Comparative Catalyst 2

A portion of the calcium-form mordenite as prepared in EXAMPLE 2 was used as a comparative catalyst. This will be referred to as "Comparative Catalyst 2".

Comparative Example 3

Preparation of Comparative Catalyst 3

A portion of the sodium-form ZSM-5 as prepared in EXAMPLE 5 was used as a comparative catalyst. This will be referred to as "Comparative Catalyst 3".

Comparative Example 4

Preparation of Comparative Catalyst 4

A portion of the calcium-form beta type zeolite as prepared in EXAMPLE 6 was used as a comparative catalyst. This will be referred to as "Comparative Catalyst 4".

Comparative Example 5

Preparation of Comparative Catalyst 5

A portion of the platinum-loaded titanium oxide as prepared in EXAMPLE 7 was used as a comparative catalyst. This will be referred to as "Comparative Catalyst 5".

Comparative Example 6

Preparation of Comparative Catalyst 6

A portion of the platinum-loaded zirconium oxide as prepared in EXAMPLE 8 was used as a comparative catalyst. This will be referred to as "Comparative Catalyst 6".

Comparative Example 7

Preparation of Comparative Catalyst 7

An alumina material (commercially available from Catalysts and Chemicals Industries Co., Ltd. under the trade mark "ACP-1") in an amount of 20 g was added into 180 mls. of a 2.85 mM aqueous solution of tetraammine-dichloro platinum. The resulting mixture was dried at 80° C. under reduced pressure to give a platinum-loaded alumina. This will be referred to as "Comparative Catalyst 7" hereinafter. By ICP emission spectroscopy, a platinum content of 0.5% by weight was found, but no rare earth elements were detected. By a nitrogen adsorption method, it was determined that the alumina had such a pore size distribution that, where "a" represented a pore radius in Å at the maximum of the pore size distribution curve, the accumulated pore volume of pores having radii in the range of "a"±25 Å was 49% of the total volume of all the pores.

Comparative Example 8

Preparation of Comparative Catalyst 8

An alumina material (commercially available from Sumitomo Chemical Co., Ltd. under the trade mark "TA-2311")

in an amount of 20 g was added into 180 mls. of a 2.85 mM aqueous solution of tetraammine-dichloro platinum. The resulting mixture was dried at 80° C. under reduced pressure to give a platinum-loaded alumina. This will be referred to as "Comparative Catalyst 8" hereinafter. BY ICP emission spectroscopy, a platinum content of 0.5% by weight was found, and the rare earth element lanthanum was detected to be present at a content of 3% by weight. By a nitrogen adsorption method, it was determined that the alumina had such a pore size distribution that, where "a" represented a pore radius in Å at the maximum of the pore size distribution curve, the accumulated pore volume of pores having radii in the range of "a"±25 Å was 66% of the total volume of all the pores.

Catalyst Performance Evaluation 1

Each of the catalysts prepared in the previous Examples 1–12 and Comparative Examples 1–8 was pelletized, crushed, and graded into 12 to 20 mesh. A 2 ml sample of particles in such a size range was packed in an atmospheric pressure fixed bed reactor. With respect to Catalyst 12, a combination catalyst, the front stage catalyst and the rear stage catalyst were pelletized, crushed, and graded into 12–20 mesh, separately. The particles of the graded front stage catalyst in an amount of 1 ml were packed in the upstream portion of the fixed bed, and the particles of the graded rear stage catalyst in an amount of 1 ml were packed in the downstream portion of the fixed bed, thus forming a two-stage catalyst bed (Catalyst 12).

The catalyst bed was pretreated by passing therethrough an air stream at 500° C. for 1 hour. After this pretreatment, a gas having a composition as set forth in Table 1 was passed through the bed at a flow rate of 360 ml/min at a temperature of 400° C. or 450° C.

TABLE 1

| Gas Composition | |
|---|---|
| EDC | 8000 p.p.m. |
| $O_2$ | 8.49% |
| $H_2O$ | 7.97% |
| $N_2$ | balance |

A steady state catalytic activity at each of the temperatures was determined. Residual concentration of 1,2-dichloroethane (referred to as EDC hereinafter), concentration of by-product vinyl chloride monomer (referred to as VCM) and total concentration of hydrocarbons (referred to as THC) at each of the test temperatures are listed in Tables 2 and 3. The THC concentration means an accumulated concentration of EDC, VCM and other by-product hydrocarbons found the effluent gas stream.

TABLE 2

Concentrations of various substances in effluent gas stream

| CATALYSTS | TEMP. ° C. | CONCENTRATIONS OF SUBSTANCES (p.p.m.) | | |
|---|---|---|---|---|
| | | EDC | VCM | THC |
| 1 | 400 | 3.69 | 11.09 | 62.1 |
| | 450 | 2.01 | 5.18 | 28.5 |
| 2 | 400 | 2.96 | 6.16 | 51.7 |
| | 450 | 0.18 | 2.15 | 18.1 |
| 3 | 400 | 0.95 | 3.61 | 44.4 |
| | 450 | 1.16 | 0.87 | 19.2 |

TABLE 2-continued

Concentrations of various substances in effluent gas stream

| CATALYSTS | TEMP. ° C. | CONCENTRATIONS OF SUBSTANCES (p.p.m.) | | |
|---|---|---|---|---|
| | | EDC | VCM | THC |
| 4 | 400 | 0.98 | 3.68 | 37.3 |
| | 450 | 2.12 | 0.64 | 18.0 |
| 5 | 400 | 4.13 | 8.04 | 53.0 |
| | 450 | 1.85 | 1.96 | 16.7 |
| 6 | 400 | 0.19 | 7.09 | 12.9 |
| | 450 | 0.45 | 0.97 | 1.4 |
| 7 | 400 | 1.43 | 2.17 | 4.3 |
| | 450 | 1.24 | 0.72 | 1.9 |
| 8 | 400 | 3.33 | 15.21 | 104.9 |
| | 450 | 1.66 | 2.99 | 20.4 |
| 9 | 400 | 123.07 | 14.58 | 158.0 |
| | 450 | 2.25 | 8.09 | 19.4 |
| 10 | 400 | 4.99 | 7.57 | 23.6 |
| | 450 | 1.85 | 0.42 | 5.9 |
| 11 | 400 | 4.19 | 89.96 | 94.2 |
| | 450 | 3.97 | 0.87 | 4.9 |
| 12 | 400 | 1.27 | 58.57 | 234.9 |
| | 450 | 0.62 | 12.10 | 195.1 |

TABLE 3

Concentrations of various substances in effluent gas stream

| COMPARATIVE CATALYSTS | TEMP. ° C. | CONCENTRATIONS OF SUBSTANCES (p.p.m.) | | |
|---|---|---|---|---|
| | | EDC | VCM | THC |
| 1 | 400 | 90.81 | 3178.4 | 5061.6 |
| | 450 | 9.91 | 1888.0 | 5124.8 |
| 2 | 400 | 75.52 | 3099.5 | 4504.5 |
| | 450 | 8.35 | 1787.4 | 4568.7 |
| 3 | 400 | 88.58 | 4002.5 | 4808.3 |
| | 450 | 8.88 | 1805.2 | 4900.5 |
| 4 | 400 | 80.53 | 3058.3 | 4404.8 |
| | 450 | 7.58 | 1745.5 | 4280.6 |
| 5 | 400 | 240.51 | 20.85 | 255.3 |
| | 450 | 20.35 | 12.85 | 35.1 |
| 6 | 400 | 280.42 | 35.87 | 350.3 |
| | 450 | 15.52 | 10.73 | 28.6 |
| 7 | 400 | 501.35 | 151.22 | 772.1 |
| | 450 | 16.63 | 8.88 | 42.4 |
| 8 | 400 | 2101.94 | 8.83 | 2157.7 |
| | 450 | 145.14 | 29.69 | 190.8 |

Catalyst Performance Evaluation 2

Each of Catalysts 6 and 9 prepared in the previous Examples and Comparative Catalyst 7 was pelletized, crushed, and graded into 12 to 20 mesh. A 2 ml sample of particles in such a size range was packed in an atmospheric-pressure fixed bed reactor. The catalyst bed was pretreated by passing the therethrough an air stream at 500° C. for 1 hour. After the pretreatment, the bed was cooled down to a temperature of 100° C. and a gas having a composition as set forth in Table 4 was passed through the bed at a flow rate of 360 ml/min., while raising the temperature at a heating rate of 10° C. per minute.

TABLE 4

| Gas Composition | |
|---|---|
| ethylene | 4000 p.p.m. |
| $O_2$ | 11.1% |

TABLE 4-continued

| Gas Composition | |
| --- | --- |
| H₂O | 0.3% |
| N₂ | balance |

Temperatures at which conversions of hydrocarbon in the fed gas stream reached 50% and 90% were determined. Table 5 shows temperatures at which 50 and 90% of ethylene conversions were observed.

TABLE 5

| | Conversions attained at Temperatures (° C.) | |
| --- | --- | --- |
| | 50% Conversion | 90% Conversion |
| Catalyst 6 | 205 | 218 |
| Catalyst 9 | 210 | 228 |
| Comp. Cat. 7 | 228 | 251 |

From the results shown in Tables 2, 3 and 5, use of the present invention enables the removal of organic compounds contained in a gas stream by catalytic combustion of them at lower temperatures and more efficiently than could be performed by the prior art. The invention is expected to be very useful in maintaining a clean environment.

What is claimed is:

1. A process for removing an organic compound or compounds by catalytic combustion, said process comprising the step of contacting the organic compound or compounds with a combustion catalyst which comprises a mixture of a zeolite and an alumina having a pore size distribution such that, where "a" represents a pore radius in Å at the maximum of the pore size distribution curve, the accumulated pore volume of pores having radii in the range of "a"±25 Å is at least 65% of the total volume of all the pores, said alumina containing less than 1% by weight of rare earth elements, where the alumina is loaded with at least one of the elements of the platinum group.

2. A process according to claim 1, wherein the organic compound or compounds is/are a halogen-containing organic compound or compounds, and wherein the zeolite and the alumina are in powder form.

3. A process according to claim 1 wherein the organic compound(s) show a vapor pressure of 0.01 kPa or higher at a temperature of 293.15° K., and wherein the zeolite and the alumina are in powder form.

4. A process according to claim 1, wherein a gas containing organic compound(s) is treated, said organic compound (s) being present in a concentration of not greater than 1% by volume in said gas, and wherein the zeolite and the alumina are in powder form.

5. A process according to claim 1 wherein the organic compound or compounds is/are a C₂ hydrocarbon or hydrocarbons, and wherein the zeolite and the alumina are in powder form.

6. A process according to claim 1 wherein the organic compound or compounds is/are a chlorinated C₂ hydrocarbon or hydrocarbons, and wherein the zeolite and the alumina are in powder form.

7. A process according to claim 1 wherein the ratio of the alumina loaded with the platinum group metal to the zeolite in the catalyst ranges from 1:20 to 20:1 by weight.

8. A process according to claim 1 wherein the zeolite is ion-exchanged with ionic species from group IA and/or group IIA.

9. A process for removing an organic compound or compounds by catalytic combustion, said process comprising the step of contacting an organic compound or compounds with a catalyst which comprises an alumina having a pore size distribution such that, where "a" represents a pore radius in Å at the maximum of the pore size distribution curve, the accumulated pore volume of pores having radii in the range of "a"±25 Å is at least 65% of the total volume of all the pores, said alumina containing less than 1% by weight of rare earth elements and being loaded with at least one of the elements of the platinum group.

10. A process according to claim 9, wherein the organic compound or compounds is/are a halogen-containing organic compound or compounds.

11. A process according to claim 9, wherein the organic compound or compounds show a vapor of pressure of 0.01 kPa or higher at a temperature of 293.15° K.

12. A process according to claim 9, wherein a gas containing an organic compound or compounds is treated, said organic compound or compounds being present in a concentration of not greater than 1% by volume in said gas.

13. A process according to claim 9 wherein the organic compound or compounds is/are a C₂ hydrocarbon or hydrocarbons.

14. A process according to claim 9, wherein the organic compound or compounds is/are a chlorinated C₂ hydrocarbon or hydrocarbons.

* * * * *